United States Patent Office 3,573,262
Patented Mar. 30, 1971

3,573,262
RUBBER STOCK COMPOSITIONS CONTAINING N,N'-DILACTAMDISULFIDES
Klaus Morche, Mannheim-Neuostheim, and Helfried Ehrend, Speyer (Rhine), Germany, assignors to Rhein-Chemie GmbH, Mannheim, Germany
No Drawing. Filed Sept. 16, 1968, Ser. No. 760,098
Claims priority, application Germany, Nov. 23, 1967,
P 17 20 160.4
Int. Cl. C08f 27/06
U.S. Cl. 260—79.5          11 Claims

ABSTRACT OF THE DISCLOSURE

A vulcanizable rubber stock composition of improved storability is obtained by forming an intimate mixture including as essential constituents at least one diene-rubber and a sulfur donor including an effective amount of at least one N,N'-dilactamdisulfide, which mixture may be stored for prolonged periods of time at relatively high temperature without losing its vulcanization characteristics.

BACKGROUND OF THE INVENTION

The copending application Ser. No. 687,971 by Kern et al., entitled "N,N'-Sulfides and Method of Making the Same," which copending application was filed on Dec. 5, 1967 and is assigned to the assignee of the present application, discloses N,N'-sulfides, including N,N'-dilactamdisulfides of the formula

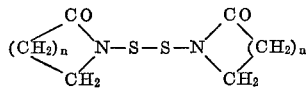

wherein $n$ denotes an integer between 1 and 10 inclusive.

Surprisingly, it has now been found that the above compound disclosed in the copending application (the contents of which are included herein by reference) is an excellent vulcanizing agent for the vulcanization of diene-rubbers, and that the utilization of such N,N'-dilactamdisulfides as sulfur donor will improve the storability of the thus-formed rubber stock and the heat aging resistance of the vulcanized product obtained therefrom.

It has been proposed to obtain vulcanized rubber products of improved heat aging characteristics by heating rubber stock compositions which contain diene-rubber and N,N'-dimorpholinedisulfide as sulfur donor and cross-linking agent, as well as vulcanization accelerators. The thus-obtained vulcanized products have a better heat aging resistance than similar vulcanized products which were produced in the same manner, but with elementary sulfur as the cross-linking agent.

The advantage which is thus obtained by utilizing N,N'-dimorpholinedisulfide as sulfur donor and cross-linking agent is, however, connected with the disadvantage that N,N'- dimorpholinedisulfide per se as well as rubber stock compositions containing the same have poor storability and that the N,N'-dimorpholinedisulfide is quickly decomposed, particularly in the presence of moisture and at elevated temperatures. Since after such partial decomposition only the residual undecomposed portion of the N,N'-dimorpholinedisulfide is available for vulcanization, and such decomposition is an uncontrollable process so that the proportion of still active N,N'-dimorpholinedisulfide in the stored rubber stock mixture will vary and is unknown, it is not possible to obtain predictable and reproducible results by working up rubber stock compositions containing N,N'-dimorpholinedisulfide which have been stored, even for relatively limited periods of time.

It is a further disadvantage of the utilization of N,N'-dimorpholinedisulfide, that the same is highly sensitive to acids. In the presence of acidic agents, the N,N'-dimorpholinedisulfide is quickly and practically completely decomposed. However, a large proportion of the conventional rubber stock compositions contain necessarily acidic constituents such as pine tar, resinic acid, stearic acid, and the like. Since the N,N'-dimorpholinedisulfide included in mixtures which contained acidic constituents will be decomposed, it is not possible to vulcanized such rubber stock compositions which contain acidic constituents by utilizing N,N'-dimorpholinedisulfide as the cross-linking agent.

It is therefore an object of the present invention to provide a rubber stock composition and a method of vulcanizing diene-rubbers which will result in the formation of vulcanized products possessing favorable heat aging characteristics and having a small pressure deformation residue, which vulcanized mixtures can be easily and in a reproducible manner subjected to heat and pressure vulcanization even if the rubber stock compositions had been stored prior to vulcanization for long periods of time and may contain acidic constituents.

It may be noted at this point that the term "diene-rubber" as used throughout the present description and the appended claims is meant to denote all vulcanizable elastomers which contain vulcanizable double bonds in the molecular chain. Thus, this term excludes those vulcanizable elastomers which do not possess such double bonds and also are not vulcanizable with sulfur.

In other words, the polymer, rubber, synthetic or natural, which is to be subjected to vulcanization utilizing, in accordance with the present invention, N,N'-dilactamdisulfide, will consist of polymerized monomers which initially contained two double bonds in the molecule and, for this reason, are chemically defined as dienes, such as butadiene. Obviously, the polymerized product does not necessarily contain all of the double bonds of the monomeric groups since a portion of these double bonds may have been saturated during the polymerization of the monomers.

The present invention is thus not limited to rubber stock compositions and to the vulcanization thereof, which rubber stock compositions contain the diene-rubber commercially available under the trademark "Diene."

SUMMARY OF THE INVENTION

The present invention is concerned with a method of heat vulcanization of rubber stock compositions, and with such vulcanizable rubber stock compositions which include diene-rubber, a sulfur donor and generally also vulcanization accelerators and which also may include the conventional additives for vulcanizable rubber mixtures such as other types of rubber, sulfur or other cross-linking agents, zinc oxide,, stearic acid, filler materials, dyestuffs, softeners, age resisting agents and other auxiliary materials, whereby it is proposed according to the present invention that the sulfur donor consist exclusively or partially of an effective amount of N,N'-dilactamdisulfides.

The present invention thus proposes a vulcanizable rubber stock composition including as essential constitutents at least one diene-rubber, and a sulfur donor including an effective amount of at least one N,N'-dilactamdisulfide.

Preferably, the N,N'-dilactamdisulfide includes in each of its two lactam rings between three and twelve carbon atoms, and most preferably between four and eight carbon atoms. The effective amount of the N,N'-dilactamdisulfide which is utilized according to the present invention generally will be equal to about 0.1 and 10% of the weight of the diene rubber which is to be vulcanized and, most preferably, this effective amount will be equal to between about 0.5 and 3% of the weight of the diene-rubber.

The N,N'-dilactamdisulfide need not be the only sulfur donor but preferably will constitute at least 10% of said sulfur donor and more preferably between about 25 and 40% thereof, but it is also entirely and frequently preferred to use larger proportions of the N,N'dilactamdisulfide, or to use the N,N'-dilactamdisulfide as the only sulfur donor in the vulcanizable rubber stock mixture.

DESCRIPTION OF THE PREFERRED EMBODIMENTS

The present invention proposes a vulcanizable rubber stock composition which includes as essential constituents at least one diene-rubber and N,N'-dilactamdisulfide as a sulfur donor and cross-linking agent, and which generally will also include vulcanization accelerators. In addition, the vulcanizable rubber stock composition of the present invention may include conventional constitutents known to those skilled in the art. The thus-obtained vulcanizable rubber-stock composition is then heated to vulcanization temperature to form a vulcanized rubber product.

Surprisingly, the vulcanizable rubber stock compositions of the present invention may be stored for prolonged periods of time, even if they include acidic components. Due to their excellent storability, vulcanization may be carried out after such prolonged storage and still will give the desired, predictable and reproducible result. The thus-obtained vulcanized products possess excellent resistance against deterioration by heat aging and give a small pressure deformation residue. These favorable effects are one of the surprising results of the utilization of N,N'-dilactamdisulfides as the sulfur donor and cross-linking or vulcanization agent.

The present invention may be carried out in the following manner:

The diene-rubber, N,N'-dilactamdisulfide and the conventional vulcanization accelerator as well as any desired additional, per se conventional, additives, are mixed in conventional manner and in conventional sequence either on a mixing roller or a mixer, for instance of the Banbury type. No particular precautions have to be taken in view of the presence of the novel cross-linking agent, i.e. the N,N'-dilactamdisulfide.

The thus-obtained rubber stock compositions may be stored for very long periods of time without any deterioration or decomposition of the N,N'-dilactamdisulfide. The unvulcanized rubber stock compositions, as well as the vulcanized products made thereof, do not show any surface blooming. The thus-obtained vulcanizable rubber stock composition can be perfectly vulcanized even after prolonged storage and give vulcanized products of low pressure deformation residue and excellent heat aging characteristics.

The vulcanizable rubber stock compositions are vulcanized by being exposed to heat, with or without pressure, for instance in a conventional vulcanizing press or vulcanizing vessel, utilizing steam or hot air as the heat carrier. Vulcanizing temperatures and the length of time of vulcanization are conventional, namely between about 1 and 20 minutes or more at between about 120 and 170° C. By utilizing modern vulcanizing methods such as the salt bath method or the metal bath method, or the so-called Ballotini method, or a fluid bed process, the vulcanization periods may be considerably shortened and may be as short as a few seconds, but the vulcanizing temperatures used in connection with these short time methods may be about 250° C. and thus considerably higher than is generally the case.

Due to the high vulcanizing temperatures which may be used in accordance with the last-mentioned methods, the vulcanizable rubber stock compositions must be highly resistant against heat aging and the same holds true in cases where injection molding methods are utilized so that the vulcanized product will be exposed to heat for prolonged periods of time.

In accordance with all of these methods, it has been particularly difficult to produce large, thick-walled vulcanized rubber bodies. The greater the cross-sectional dimensions of the intended vulcanized body, the longer it will take until the required vulcanization temperature is reached in the innermost portion of the body. For this reason, there exists a particularly serious danger that the outer portions of the molded body will be excessively vulcanized and will be subject to heat degradation while the innermost portions are still insufficiently or just sufficiently vulcanized.

Utilization of N,N'-dilactamdisulfides as sulfur donor and cross-linking agent will substantially reduce the danger of heat degradation and thus facilitate the production of large and thick-walled vulcanized rubber articles.

However, the present invention is not only significantly advantageous in connection with vulcanization processes in which overheating of the outer portions of the vulcanized product is to be avoided during vulcanization of the same, but surprisingly, it has also been found that the finished vulcanized body product in accordance with the present invention possesses heat aging resistance and a low pressure deformation residue which compare favorably with prior-art products. This is particularly important in connection with such vulcanized products which during usage are continuously exposed to elevated temperatures and possibly also simultaneously to high-pressure loads, such as packings, rollers, rail supports and the like. In these cases, the excellent heat aging resistance of vulcanized products produced in accordance with the present invention and the small pressure deformation residue thereof are of greatest technical and economical importance.

The vulcanization in accordance with the present invention, i.e., utilizing N,N'-dilactamdisulfides as an essential constituent of the sulfur donor, may be carried out with any one of the diene-rubbers which in accordance with conventional methods may be vulcanized with elementary sulfur as the sulfur donor.

Particularly good results are achieved in the vulcanization according to the present invention of natural rubber, polyisoprene, polybutadiene, polychloroprene, as well as copolymerizates of butadiene with styrene, butadiene with nitriloacrylic acid and of isobutylene with isoprene.

Other types of rubber which do not have diene characteristics, for instance chlorosulfonated polyethylene (Hypolon) or ethylene-propylene rubber may be incorporated in the vulcanizable rubber stock composition according to the present invention, but more in the nature of an additive, since these other types of rubber do not appear to be vulcanizable with N,N'-dilactamdisulfide as the sulfur donor and cross-linking or vulcanizing agent. It may be assumed that the non-diene-rubber of the vulcanizable rubber stock composition of the present invention will be present in the vulcanized products obtained thereof in unvulcanized condition and thus will have an effect similar to that of a polymeric softener.

The N,N'-dilactamdisulfides which are utilized as vulcanizing agents in accordance with the present invention have been disclosed in the aforementioned copending application, Ser. No. 687,971, assigned to the same assignee as the present application, and the contents of which are included herein by reference.

According to application 687,971, N,N'-dilactamdisulfide which, according to the present invention, are used to fully or partially replace elementary sulfur or other vulcanizing agents, are produced by the reaction of disulfur-dichloride with lactams which carry at the nitrogen atom a free hydrogen or metal atom. The reaction is preferably carried out in an inert solvent and may be carried out with the addition of acid acceptors.

The N,N'-diactamdisulfides which are utilized according to the present invention have the formula:

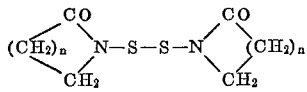

wherein n is an integer between 1 and 10 inclusive, preferably between 2 and 6 inclusive.

N,N'-dilactamdisulfides of the above formula in which n is an integer between 2 and 6 inclusive are preferred as vulcanizing agents for diene-rubbers in accordance with the present invention, i.e., such N,N'-dilactamdisulfides which in each of the two lactam rings contain between four and eight carbon atoms. This group of lactams can be produced in a high yield from relatively easily available starting materials.

However, all N,N'-dilactamdisulfides as described above, i.e. those in which n denotes an integer between 1 and 10 inclusive so that each of the two lactam rings contains between 3 and 12 carbon atoms are excellently suitable for the purpose of the present invention. N,N'-dilactamdisulfides with less than 4 or more than 8 carbon atoms are more difficult to obtain and consequently more expensive to produce and for this reason less desirable than those in which n is an integer between 2 and 6 inclusive.

The proportion of N,N'-dilactamdisulfides which is to be incorporated in the vulcanizable rubber stock composition of the present invention preferably will be between 0.1 and 10% and most preferably between 0.5 and 3% based on the diene-rubber amount present in the composition.

Proportions of the N,N'-dilactamdisulfide which are smaller than 0.1% of the weight of the diene-rubber have insufficient effectiveness and proportions higher than 10% will not cause a further improvement in the effectiveness. Generally, the most preferred range as described above, namely between 0.5 and 3% of the weight of the diene-rubber, will give the desired vulcanization effect under the most economical conditions.

The vulcanizable rubber stock compositions according to the present invention thus will contain as essential constituents diene-rubber and N,N'-dilactamdisulfide, the latter as sulfur donor and cross-linking or vulcanizing agent. Furthermore, it is desirable in practically all cases to include a vulcanization accelerating agent in the rubber stock composition. Such accelerator is necessary in order to carry out the vulcanization within a technically and economically feasible time period. It is possible to carry out the cross-linking or vulcanization in the absence of an accelerator, but in such case the reaction is prolonged to such an extent that the method generally would become uneconomical.

A great variety of vulcanization accelerating agents may be used as constituents of the vulcanizable rubber stock composition of the present invention. These include mecaptobenzthiazoldisulfide, diphenylguanidine, di-o-tolylguanidine, cyclohexylbenzthiazolsulfenamide, tetramethylthiuramdisulfide, etc. The replacement of conventional sulfur donors and cross-linking agents with N,N'-dilactamdisulfide does not limit the choice of vulcanization accelerators. In fact, all of the conventionally used accelerators may be utilized in accordance with the present invention. In a per se conventional manner, in connection with some vulcanization accelerating agents, zinc oxide and, if desired, also stearic acid are added.

It is also possible to utilize as sulfur donor a combination of elementary sulfur or sulfur donors and vulcanizing agents such as thiuramtetrasulfide or other vulcanizing agents such as dibenzyl-p-quinonedioxam, in combination with the inventive N,N'-dilactamdisulfide.

The lower limit of the proportion of the sulfur donor which is to be represented by N,N'-dilactamdisulfide will vary with the composition of the vulcanizable rubber stock. In relatively extreme cases, it may suffice if the dilactamdisulfide is present in an amount equal to only about 10% of the total sulfur, or a similar or larger percentage of the sulfur or the like may be replaced with N,N'-dilactamdisulfide.

As will be shown in the examples further below, substantial improvements are achieved by replacing three parts of sulfur with 1.5 parts of sulfur and 1.0 part of N,N'-dilactamdisulfide, or by replacing three parts of sulfur with 1.5 parts of sulfur and 0.55 part of the N,N'-dilactamdisulfide. However, it is of course within the scope of the present invention to utilize the N,N'-dilactamdisulfide as the exclusive sulfur donor and vulcanizing or cross-linking agent.

Conventional filler materials may be incorporated into the vulcanizable rubber stock composition of the present invention. These may include furnace soot, other types of carbon of a great variety of qualities, as well as inactive, semi-active or active light-colored fillers, such as barite, Neubürger silicon chalk, alumina-gel, precipitated calcium silicate, precipitated or pyrogenic silicic acid, etc.

Similarly, softeners, dyestuffs and other auxiliary agents, age resisting agents, and the like, may be utilized in conventional manner; no particular choice has to be made in view of the utilization of N,N'-dilactamdisulfide in accordance with the present invention.

The following examples are given as illustrative only, without limiting the invention to the specific details of the examples.

EXAMPLE 1

The constituents indicated in Table I below were mixed in conventional manner on a mixing roller device and blanks were shaped of the completed mixture. The blanks were vulcanized in a vulcanizing press at 140° C. during a period of 30 minutes so as to produce plates thereof. Testing bodies were punched from the thus-formed plates in a conventional manner and the results obtained by testing these bodies are also shown in Table I.

TABLE I

| Mixture (parts by weight) | A | B |
|---|---|---|
| Natural Rubber (first latex crepe) | 100 | 100 |
| Stearic acid | 1 | 1 |
| Antioxidant [1] | 1 | 1 |
| Barium sulfate | 75 | 75 |
| Zinc oxide | 10 | 10 |
| Titanium dioxide | 10 | 10 |
| Mercaptobenzthiazoldisulfide | 0.75 | 0.75 |
| Sulfur | 2.5 | |
| N,N'-dicaprolactamdisulfide | | 2.7 |
| Press vulcanization for 30 minutes at 140° C.: | | |
| Without aging: | | |
| Tearing strength (kg./cm.$^2$) | 177 | 201 |
| Breaking elongation (percent) | 710 | 700 |
| After aging for 24 hours at 100° C.: | | |
| Tearing strength (kg./cm.$^2$) | 163 | 183 |
| Breaking elongation (percent) | 560 | 620 |
| After aging for 48 hours at 100° C.: | | |
| Tearing strength (kg./cm.$^2$) | 41 | 161 |
| Breaking strength (percent) | 300 | 560 |

[1] 2,2'-dihydroxy-3,3'-di(methylcyclohexyl)-5,5'-dimethyldiphenylmethane.

It is clearly apparent from Table I that mixtures which contain natural rubber, N,N'-dicaprolactamdisulfide as sulfur donor and cross-linking agent, as well as mercaptobenzthiazoldisulfide as vulcanization accelerator, may be vulcanized without requiring the addition of elementary sulfur or any other sulfur donor or other cross-linking or vulcanizing agents. The N,N'-dicaprolactamdisulfide which is incorporated into mixture B acts as an independent and sufficient cross-linking agent.

The vulcanized products which are produced with utilization of N,N'-dicaprolactamdisulfide from the mixture identified as B possess a considerably improved resistance against heat aging as compared with the vulcanized products produced of mixture A which were produced with elementary sulfur as the vulcanizing agent, but otherwise under exactly the same conditions as the products of mixture B.

Practically equally favorable results are obtained if mixture B is not subjected to vulcanization immediately after having been produced but only after having been stored for 5 months at room temperature. This proves the excellent storability of vulcanizable rubber stock compositions which contain diene-rubber and N,N'-dicaprolactamdisulfide.

EXAMPLE 2

The constituents of the mixture shown in Table II were treated as described in Example 1. In this case, vulcanization was carried out in a vulcanizing press for a period of 20 minutes at a temperature of 145° C.

TABLE II

| Mixture (parts by weight) | C | D | E |
|---|---|---|---|
| Natural latex (first latex crepe) | 100 | 100 | 100 |
| Zinc oleate | 2 | 2 | 2 |
| Barium sulfate | 75 | 75 | 75 |
| Titanium dioxide | 10 | 10 | 10 |
| Zinc oxide | 10 | 10 | 10 |
| Mercaptobenzthiazoldisulfide | 0.5 | 0.5 | 0.5 |
| Diphenylguanidine | 0.2 | 0.2 | 0.2 |
| Sulfur | 3 | 1.5 | 1.5 |
| N,N'-dicaprolactamdisulfide | | 1.0 | |
| N,N'-dibutyrolactamdisulfide | | | 0.55 |
| Press vulcanization for 20 minutes at 145° C.: | | | |
| Without aging: | | | |
| Tearing strength (kg./cm.²) | 203 | 210 | 208 |
| Breaking elongation (percent) | 640 | 700 | 695 |
| After aging for 24 hours at 100° C: | | | |
| Tearing strength (kg./cm.²) | 102 | 124 | 120 |
| Breaking elongation (percent) | 475 | 595 | 580 |
| After aging for 48 hours at 100° C: | | | |
| Tearing strength (kg./cm.²) | 24 | 114 | 109 |
| Breaking elongation (percent) | 285 | 530 | 530 |

As shown in Table II with respect to N,N'-dicaprolactamdisulfide (mixture D) as well as N,N'-dibutyrolactamdisulfide (mixture E), it is also possible to utilize as sulfur donor elementary sulfur together with a N,N'-dilactamdisulfide. According to Table II, the rubber is natural rubber, but as pointed out further above, any other diene-rubber could be used to fully or partially replace the natural rubber.

It will be seen furthermore from Table II that in both cases, i.e. mixtures D and E, the vulcanized product obtained according to the present invention is much more resistant to heat aging than the vulcanized product (mixture C) which has been produced under exactly the same conditions with the only exception being that elementary sulfur was used as the sole sulfur donor or cross-linking agent.

The proportions of N,N'-dicaprolactamdisulfide on the one hand, and N,N'-dibutyrolactamdisulfide on the other hand, were arranged in accordance with the sulfur content of these two compounds, respectively.

EXAMPLE 3

The mixtures described in Table III below were treated as described in Example 1 and vulcanization was carried out for 20 minutes at 145° C.

TABLE III

| Mixture (parts by weight) | F | G | H |
|---|---|---|---|
| Butadiene styrene-copolymerizate [1] | 40 | 40 | 40 |
| Natural rubber | 40 | 40 | 40 |
| Tire regenerate | 40 | 40 | 40 |
| Zinc oleate | 2 | 2 | 2 |
| Paraffin | 6 | 6 | 6 |
| HAF-carbon black | 25 | 25 | 25 |
| Highly aromatic softener oil [2] | 5 | 5 | 5 |
| Isopropyl-p-phenylendiamine [3] | 1.5 | 1.5 | 1.5 |
| Zinc oxide | 3 | 3 | 3 |
| Mercaptobenzthiazoldisulfide | 2 | 2 | 2 |
| Di-o-tolylguanidine | 0.5 | 0.5 | 0.5 |
| N,N'-dimorpholinedisulfide | 1.5 | | |
| N,N'-dicaprolactamdisulfide | | 2.05 | |
| N,N'-dibutyrolactamdisulfide | | | 1.1 |
| Vulcanisation for 20 minutes at 145° C.: | | | |
| Hardness (Shore A) | 42 | 44 | 42 |
| Elasticity (percent) | 39 | 38 | 38 |
| Tearing Strength (kg./cm.²) | 150 | 160 | 149 |
| Breaking elongation (percent) | 650 | 630 | 690 |
| Pressure Deformation Residue: [4] | | | |
| After 24 hours at 20° C | 27 | 18 | 13 |
| After 24 hours at 50° C | 33 | 20 | 13 |
| After 24 hours at 70° C | 53 | 33 | 27 |
| After 24 hours at 100° C | 56 | 47 | 40 |

[1] With 23.5% bound styrene (Buna Huels 150).
[2] Naftolen ZD.
[3] Nonox ZA.
[4] Determined according to German Standard DIN 53,517.

It will be seen from the above table that the N.N'-dilactamdisulfides represented in Table III by the N,N'-dicaprolactamdisulfide and the N,N'-dibutyrolactamdisulfide will exhibit their vulcanizing effect also in rubber mixtures which apart from natural rubber also include other diene-rubbers, namely butadiene-styrene-copolymerizate as well as tire regenerate.

The results of the pressure deformation residue test according to DIN 53517 which are shown in Table III indicate the substantial improvement achieved according to mixtures G and H which include the N,N'-dilactamdisulfide in accordance with the present invention, as compared with the qualities of vulcanized products in which N,N'-dimorpholinedisulfide was used as the sulfur donor. The various sulfur donors of mixtures F-G were utilized in proportions corresponding to their respective sulfur content. It is thus shown in Table III that the use of the respective N,N'-dilactamdisulfides will result in vulcanized products of considerably improved resistance against heat aging as compared to products obtained in a similar manner but with the sole difference that the N,N'-dilactamdisulfide was replaced with an equivalent amount (with respect to sulfur content) of N,N'-dimorpholinedisulfide, whereby it is noteworthy that the mixture as indicated in column F appears to fairly represent the present state of the art.

EXAMPLE 4

The mixtures or compositions shown in Table IV below were treated as described in Example 1 whereby vulcanization was carried out in a vulcanizing press within the periods of time and at the temperatures indicated in the table.

TABLE IV

| Mixture (parts by weight) | J | L | K | M | N |
|---|---|---|---|---|---|
| Natural rubber (smoked sheets) | 100 | | | | |
| Nitrile rubber | | 80 | 80 | | |
| Butyl rubber | | | | 100 | 100 |
| Nitrile rubber regenerate | | 45 | 45 | | |
| Zinc oleate | 1.5 | 1.5 | 1.5 | 1 | 1 |
| Stearic acid | 3 | | | | |
| Isopropyl-p-phenylendiamine [1] | | 1.5 | 1.5 | | |
| Paraffin | | 3 | 3 | | |
| HAF carbon black | 60 | | | | |
| EPC carbon black | | 40 | 40 | | |
| FEF carbon black | | | | 40 | 40 |
| SRF carbon black | | | | 50 | 50 |
| Kaolin | | 40 | 40 | | |
| Thiodibutyric acid ester | | 10 | 10 | | |
| Naphthelene mineral oil | | | | 10 | 10 |
| Pine tar | 15 | | | | |
| Zinc oxide | 15 | 5 | 5 | 5 | 5 |
| Sulfur | 1 | | | 1.25 | 1.25 |
| Cyclohexylbenzthiazolsulfeneamide | 1 | 0.25 | 0.25 | | |
| Mercaptobenzthiazoldisulfide | | | | 1 | 1 |
| Tetramethylthiuramdisulfide | | 1.5 | 1.5 | 1.5 | 1.5 |
| N,N'-dicaprolactamdisulfide | 1.4 | 2.05 | | 1.7 | |
| N,N'-dibutyrolactamdisulfide | | | 1.1 | | 0.9 |
| Press vulcanization: | | | | | |
| Minutes | 10 | 20 | 20 | 20 | 20 |
| Degrees centigrade | 150 | 150 | 150 | 160 | 169 |
| Hardness (Shore A) | 64 | 60 | 59 | 72 | 70 |
| Elasticity (percent) | 29 | 19 | 20 | 9 | 3 |
| Tearing strength (kg./cm.²) | 233 | 122 | 125 | 69 | 73 |
| Breaking elongation (percent) | 485 | 500 | 580 | 450 | 450 |

[1] Nonox ZA.

Mixture J of Table IV shows that the vulcanization of natural rubber with N,N'-dicaprolactamdisulfide and sulfur can be carried out in an entirely satisfactory manner even if relatively highly acidic substances such as pine tar are used as softeners.

Furthermore, it will be seen from Table IV that not only natural rubber but also diene-rubbers, such as nitrile rubber and nitrile rubber regenerate (mixtures K and L) or butyl-rubber (mixtures M and N) may be excellently vulcanized by utilizing as sulfur donor and vulcanizing or cross-linking agent the N,N'-dilactamdisulfides which are exemplified in Table IV by N,N'-dicaprolactamdisulfide and N,N'-butyrolactamdisulfide.

Without further analysis, the foregoing will so fully reveal the gist of the present invention that others can by applying current knowledge readily adapt it for various applications without omitting features that from the

What is claimed as new and desired to be protected by Letters Patent is set forth in the appended claims.

1. A storable vulcanizable rubber stock composition including as essential constituents at least one diene rubber and an amount of 0.1 to 10% of at least one N,N'-dilactamdisulfide cross-linking agent, the said percentage being relative to the weight of said diene rubber and said dilactamdisulfide having 3 to 12 carbon atoms in each of its two rings.

2. A vulcanizable rubber stock composition as defined in claim 1 and including a vulcanization accelerator.

3. A vulcanizable rubber stock composition as defined in claim 1, wherein said N,N'-dilactamdisulfide includes in each of its two lactam rings between four and eight carbon atoms.

4. A vulcanizable rubber stock composition as defined in claim 1, wherein said N,N'-dilactamdisulfide is selected from the group consisting of N,N'-dicaprolactamdisulfide and N,N'-dibutyrolactamdisulfide.

5. A vulcanizable rubber stock composition as defined in claim 1 wherein said dilactamdisulfide is present in an amount equal to between about 0.5 and 3% by weight of said diene rubber.

6. A vulcanizable rubber stock composition as defined in claim 1 which includes elementary sulfur or a sulfur containing vulcanizing agent or a mixture of sulfur and sulfur containing vulcanizing agent as additional cross-linking agent.

7. The vulcanizable rubber stock composition of claim 6 wherein said additional sulfur containing vulcanizing agent is thiuramtetrasulfide.

8. A vulcanizable rubber stock composition as defined in claim 6 wherein at least 10% by weight of said cross-linking agents consists of at least one N,N'-dilactamdisulfide.

9. A vulcanizable rubber stock composition as defined in claim 7, wherein between about 25 and 40% of said crosslinking agents consists of at least one N,N'-dilactamdisulfide.

10. A vulcanizable rubber stock composition as defined in claim 1, wherein said diene-rubber is selected from the group consisting of natural rubber, polyisoprene, polybutadiene, polychloroprene, copolymerizates of butadiene and styrene, copolymerizates of butadiene and nitriloacrylic acid and copolymerizates of isobutylene and isoprene.

11. A vulcanizable rubber stock composition as defined in claim 10, wherein said N,N'-dilactamdisulfide is selected from the group consisting of N,N'-dicaprolactamdisulfide and N,N'-dibutyrolactamdisulfide and is present in an amount equal to between 0.1 and 10% of the weight of said diene-rubber.

References Cited
UNITED STATES PATENTS

| | | | |
|---|---|---|---|
| 3,362,937 | 1/1968 | Kent | 260—79.5 |
| 3,394,126 | 7/1968 | D'Amico | 260—239 |
| 3,473,667 | 10/1969 | Coran | 260—309.7 |

JAMES A. SEIDLECK, Primary Examiner

C. A. HENDERSON, Jr., Assistant Examiner

U.S. Cl. X.R.

260—41.5, 239.3, 784, 792